US006794767B2

(12) United States Patent
Bentivoglio

(10) Patent No.: US 6,794,767 B2
(45) Date of Patent: Sep. 21, 2004

(54) ACTUATOR FOR RELEASE DEVICES OF VEHICLES, PREFERABLY MOTOR VEHICLES

(75) Inventor: Helmut Bentivoglio, Blaubeuren-Seissen (DE)

(73) Assignee: Reitter & Schefenacker GmbH & Co. KG, Esslingen (DE)

( * ) Notice: Subject to any disclaimer, the term of this patent is extended or adjusted under 35 U.S.C. 154(b) by 0 days.

(21) Appl. No.: 10/062,579

(22) Filed: Jan. 30, 2002

(65) Prior Publication Data

US 2002/0162408 A1 Nov. 7, 2002

(30) Foreign Application Priority Data

Feb. 1, 2001 (DE) ........................................ 101 04 377

(51) Int. Cl.[7] ............................ B60L 1/00; H01Q 1/32; G01S 5/04

(52) U.S. Cl. ...................... 307/10.1; 343/713; 342/432

(58) Field of Search ................................ 307/10.1, 9.1; 343/713, 800, 860; 342/70, 432; 340/572.5, 572.7

(56) References Cited

U.S. PATENT DOCUMENTS

| | | | | | |
|---|---|---|---|---|---|
| 4,897,643 | A | * | 1/1990 | Shibata et al. | 340/5.72 |
| 5,402,132 | A | * | 3/1995 | Hall et al. | 342/432 |
| 5,541,588 | A | * | 7/1996 | Matsuhashi et al. | 340/870.01 |
| 5,694,115 | A | * | 12/1997 | Desatoff | 340/540 |
| 5,767,588 | A | * | 6/1998 | Nakaya et al. | 307/10.2 |
| 5,942,977 | A | * | 8/1999 | Palmer et al. | 340/572.5 |
| 6,249,242 | B1 | * | 6/2001 | Sekine et al. | 342/70 |
| 6,268,796 | B1 | * | 7/2001 | Gnadinger et al. | 340/572.5 |

* cited by examiner

*Primary Examiner*—Gregory J. Toatley, Jr.
(74) *Attorney, Agent, or Firm*—Gudrun E. Huckett

(57) ABSTRACT

An actuator for a release device of a motor vehicle has a control acting on the release device and at least one actuator element sending a signal wireless to the control for triggering a release action of the release device. The actuator element is a momentary-contact pushbutton and is part of a passive receiver. The passive receiver has a passive antenna arranged in a resonance circuit that is closed by actuating the actuator element.

22 Claims, 5 Drawing Sheets

ACTUATOR FOR RELEASE DEVICES OF VEHICLES, PREFERABLY MOTOR VEHICLES

BACKGROUND OF THE INVENTION

1. Field of the Invention

The invention relates to an actuator for release devices of vehicles, preferably motor vehicles, comprising at least one actuator element which, upon actuation, sends a signal to a control for triggering the release.

2. Description of the Related Art

It is known in connection with motor vehicles to arrange a rear window so as to be pivotable within a rear hatch. The rear window is secured in the closed position by a locking action of a release device. In order for the rear window to be pivoted upwardly, it must be released. For this purpose, an actuator element is provided on the rear window with which a relay of the control is actuated when pushing in the actuator element. The relay ensures that the rear window can be released and opened. The connection between the actuator element and the control is realized by electrical lines. Installing the electrical lines is complex and difficult. Plug connections are required for this purpose which during operation of the vehicle can become loose or even detached. In this case, the rear window can no longer be released and opened.

SUMMARY OF THE INVENTION

It is an object of the present invention to configure an actuator of the aforementioned kind such that it can be easily mounted and a failure or disturbance of the release action can be prevented even under extreme conditions.

In accordance with the present invention, this is achieved in that the actuator element is configured to supply the signal in a cordless or wireless way.

Accordingly, the actuator according to the invention is configured such that the trigger signal is transmitted wireless or cordless from the actuator element to the control. As a result of this wireless initiation of the release action, lines, cables or the like are not required. This provides for a very simple mounting of the actuator. Moreover, the actuator is not susceptible to failure and, in particular, is free of wear. A failure or a disturbance of the release action is therefore excluded even under extreme conditions.

The actuator element and the control have only a minimal spacing from one another so that a minimal power is already sufficient for transmitting the signal in order to initiate the release action. For example, the spacing between the actuator element and the control can be within a range of only 1 to 2 cm. The actuator element is provided on the component to be released, e.g., the rear window, while the control is arranged on the body of the vehicle.

DESCRIPTION OF THE PREFERRED EMBODIMENTS

Figure 3:
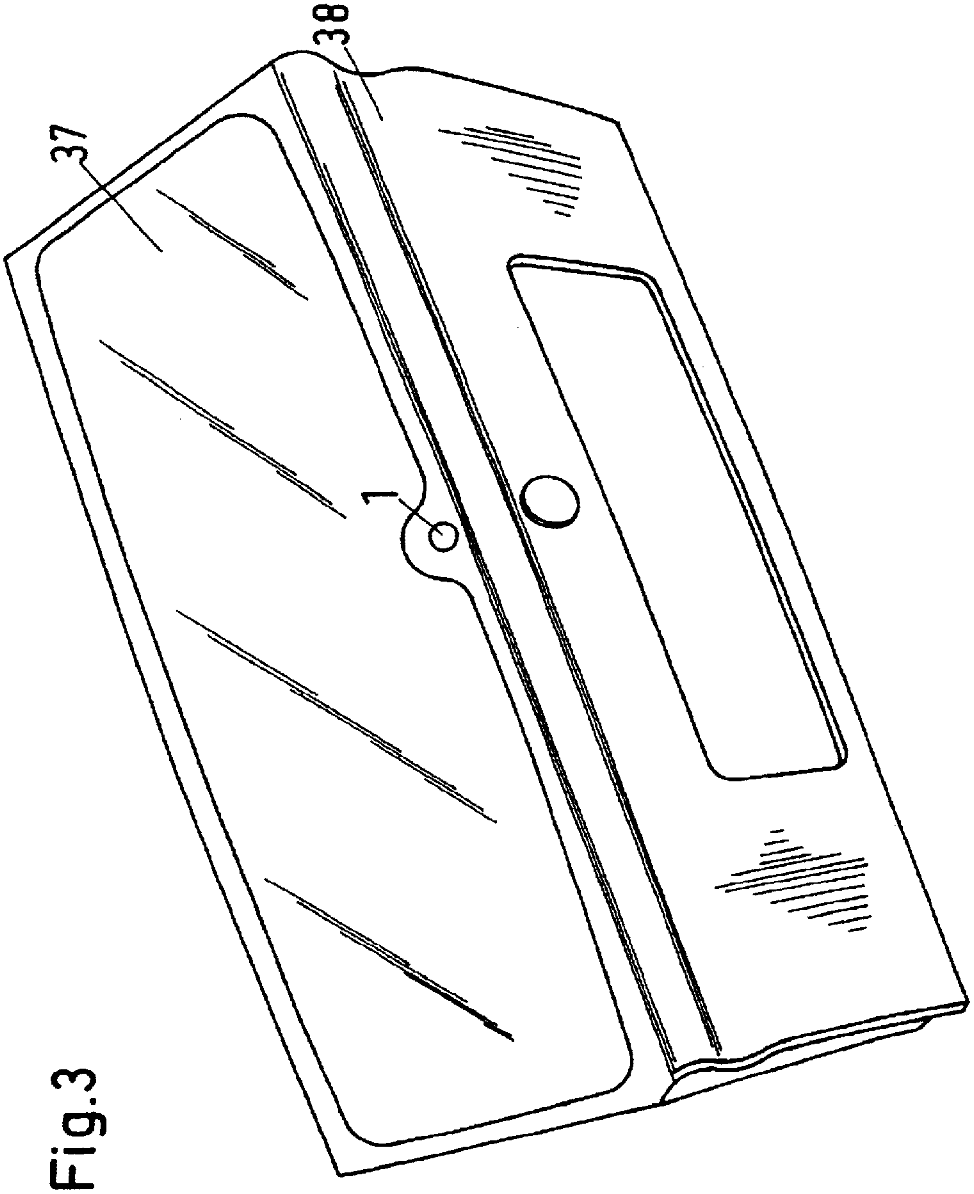
FIG. 3 shows a rear hatch of a motor vehicle with the rear window in the closed position, the rear window being provided with an actuator according to the invention.
Figure 4:
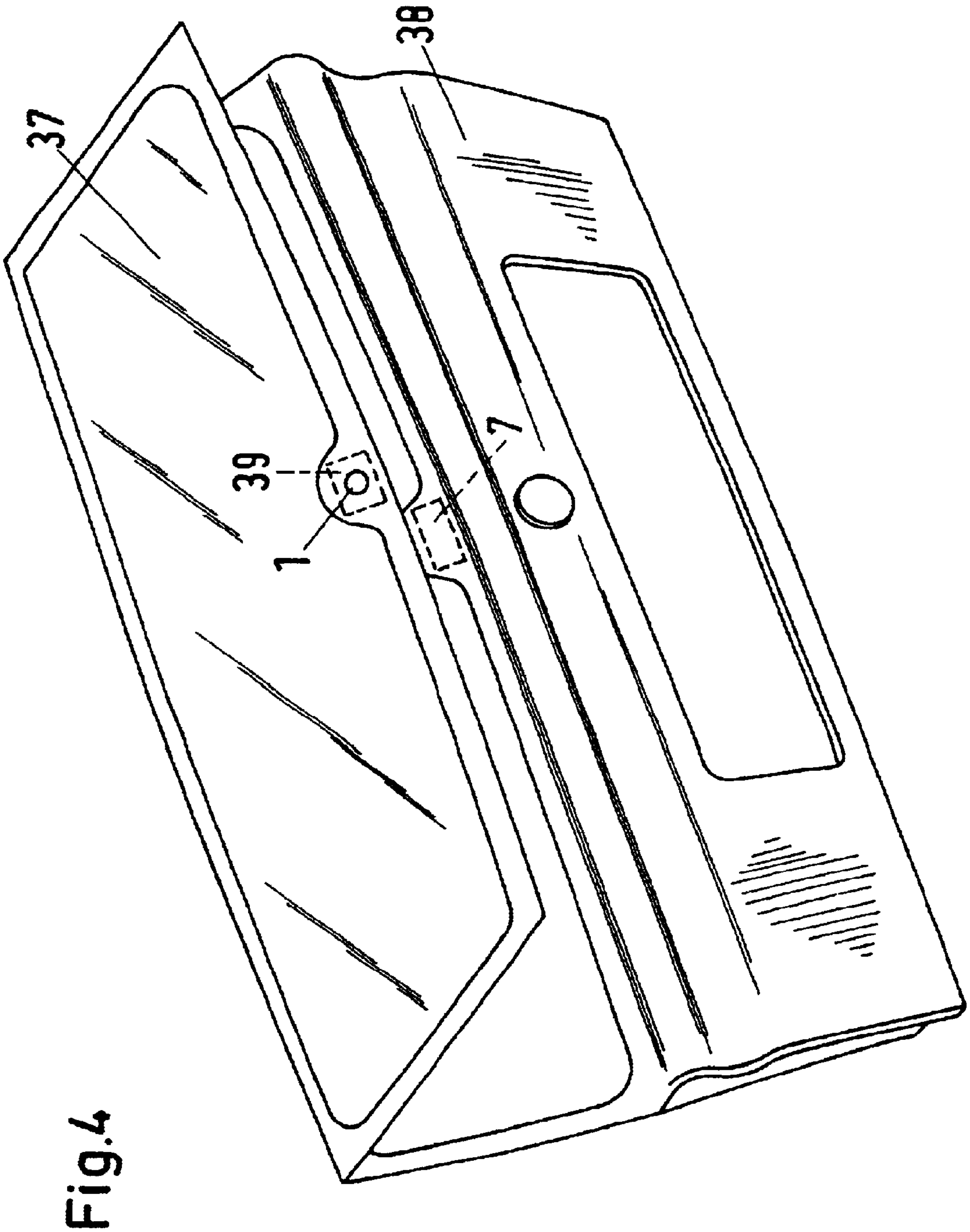
FIG. 4 illustrates the rear window according to FIG. 3 in the open position.

The actuator is used in motor vehicles and serves for releasing or unlatching, for example, the rear window 37 (FIGS. 3 and 4) of a motor vehicle. The actuator can also be used for opening the trunk lid, the hood of the engine compartment or the glove box of the motor vehicle. In the illustrated embodiment, the actuator is used for releasing or unlatching a rear window 37 of a motor vehicle, the rear window being arranged in a pivotable rear hatch 38. After release, the rear window 37 can be pivoted separately from the rear hatch 38.

On the rear window 37 of the motor vehicle a receiver 39 with a momentary-contact pushbutton 1 is arranged which is connected to a planar antenna 2. It is tuned by means of a compensating element 3 to a preselected resonance frequency. In the simplest and preferred situation, the compensating element 3 is formed by two parallel positioned capacitors 4, 5. They can be configured to be adjustable.

In order to be able to pivot the rear window 37 upwardly, the momentary-contact pushbutton 1 is pushed in and, in this way, the resonance circuit 6 is closed. In the illustrated embodiment, the resonance frequency is 13,560 MHz. Depending on the application, the resonance frequency can also be selected to be different.

The resonance circuit 6 forms a passive antenna together with the planar antenna 2 and the momentary-contact pushbutton 1 and must not be supplied with current.

As soon as the resonance circuit 6 is closed by pushing in the momentary-contact pushbutton 1, energy is taken from a sending antenna 8 arranged within a sender 7 of the actuator and preferably also in the form of a planar antenna. Accordingly, the amplitude of an oscillator 9 arranged upstream is lowered at a high resistance decoupling point 10 of a quartz 11. The high frequency voltage is rectified by a high frequency rectifier 12 and supplied to the negative input of a comparator 13. As a result of the amplitude drop at the decoupling point 10, the level at the positive output 14 of the comparator 13 downstream of the rectifier 12 decreases, so that the corresponding control signal for releasing the rear window is provided at the output 14 of the comparator 13.

The battery voltage, which in the illustrated embodiment is 12 volt, is stabilized by means of a voltage regulator 15, in the embodiment to 7 volt. A resistor 35, 36 is correlated with the input and output of the regulator 15, respectively. The signal provided at the output of the regulator 15 is supplied to the positive input of the comparator 13 which compares the regulator signal with the rectified output signal of the oscillator 9 and thus supplies the control signal.

Figure 1:
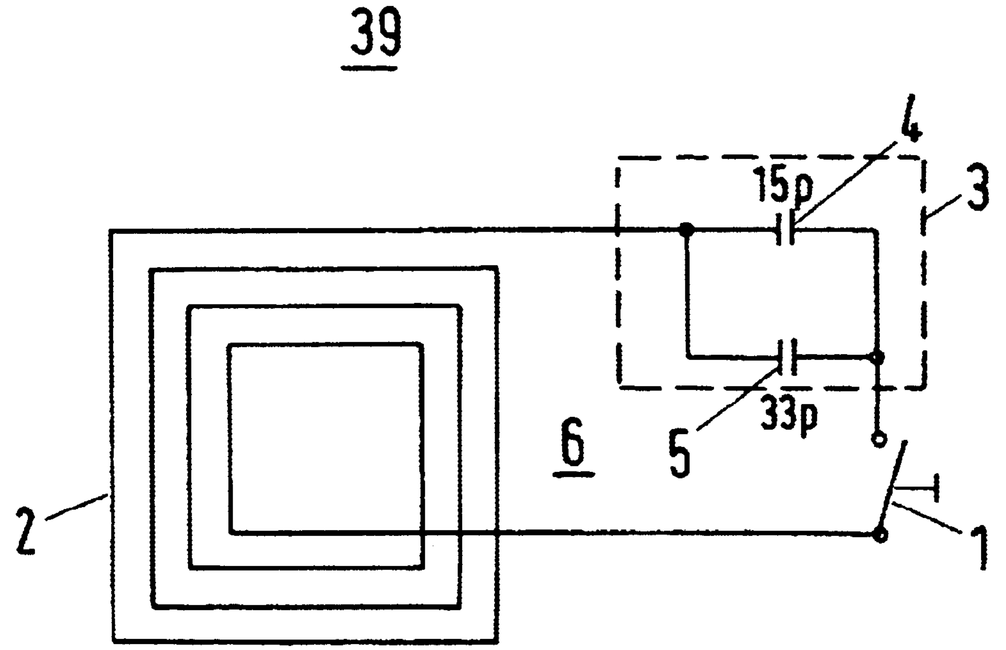
FIG. 1 shows a receiver of an actuator according to the invention.
Figure 2:
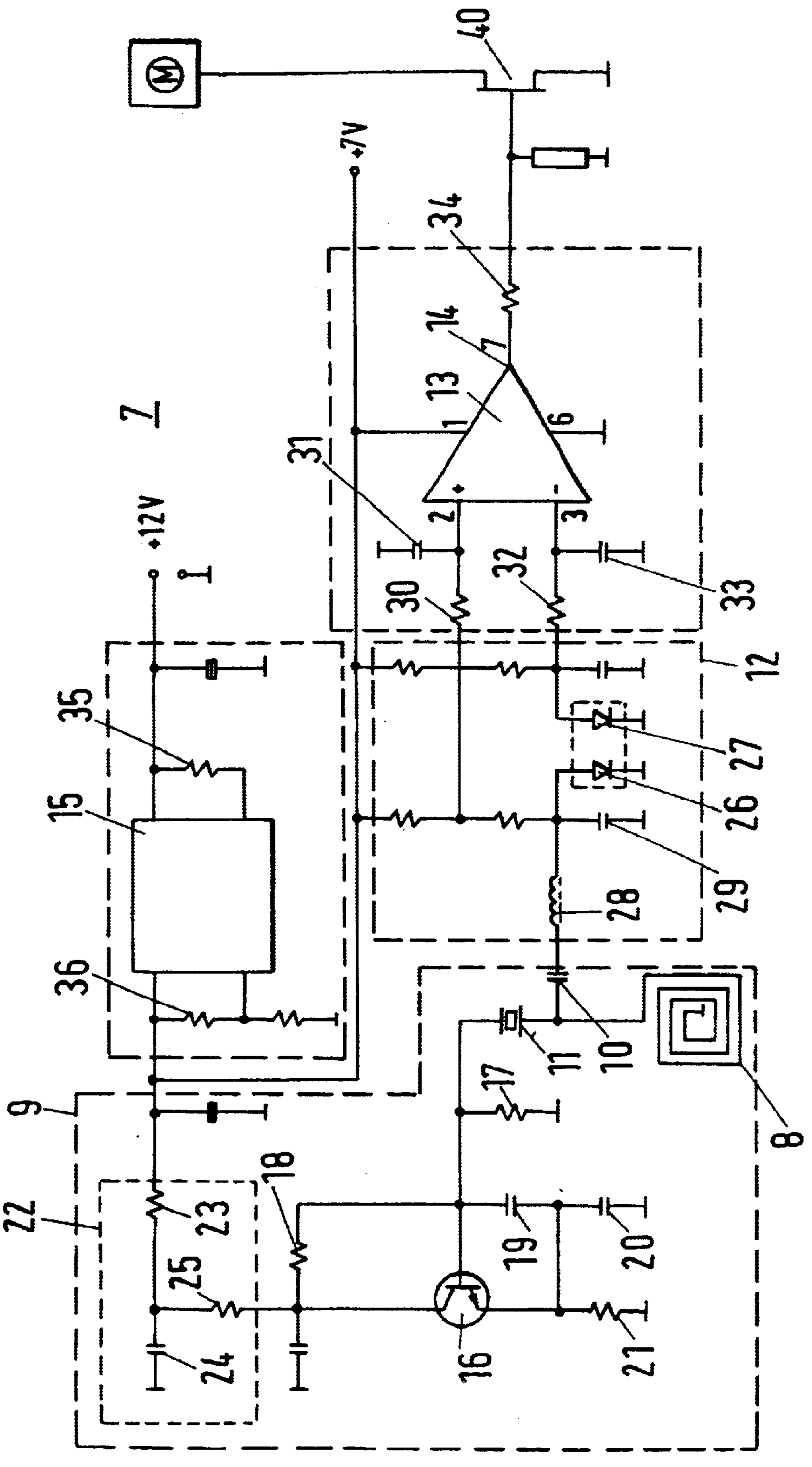
FIG. 2 is a circuit diagram of a sender of the actuator according to the invention.

The oscillator 9 has a transistor 16 which by means of the quartz 11 is adjusted to the resonance frequency of preferably 13,560 MHz (ISM—industrial, scientific, medical—band) relative to the sending antenna 8. The antenna 8 is advantageously a planar antenna, as illustrated in FIG. 2. Downstream thereof are two resistors 17, 18 which are series-connected and form a voltage divider to the base, respectively, to the working point of the transistor 16. Parallel to the resistor 17 and serially connected to the resistor 18, two capacitors 19, 20 are provided which enable feedback in order to generate the oscillation amplitude. A resistor 21 determines the emitter current to the transistor 16.

The oscillator 9 is provided with a low pass filter 22 in order to filter out disturbing radiation of the surroundings.

The low pass filter 22 is comprised of a resistor 23, having arranged downstream thereof a capacitor 24 and a resistor 25. The resistor 25 is connected to the collector circuit of the transistor 16 and is serially connected to the resistor 18 of the voltage divider.

The rectifier 12 is advantageously temperature-compensated so that, in case of temperature fluctuations, the offset voltage of the comparator input does not change. For this purpose, the converter 12 is provided with a temperature-compensating member comprising two diodes 26, 27, combined to a unit, which are thermally integrated on a chip. The decoupling location 10 on the oscillator 9 is formed by a capacitor which is adjusted such that the voltage is still so high that it surpasses the threshold voltage of the rectifier 12 by a sufficient amount in order to enable a reliable evaluation within the comparator 13.

A low pass filter 28, 29 is arranged downstream of the coupling point 10 of the oscillator 9 in order to suppress external high frequency disturbances which could result in an accidental actuation of the control. The low pass filter comprises an inductive resistor 28 and a capacitor 29 which are arranged upstream of the diodes 26, 27.

In the illustrated embodiment, a low pass filter is provided on the positive as well as negative input of the comparator 13, respectively. The low pass filter correlated with the positive input is comprised of a resistor 30 and a capacitor 31 arranged downstream. The low pass filter correlated with the negative input of the comparator 13 comprises the resistor 32 and the capacitor 33 arranged downstream. The two resistors 30, 32 and the two capacitors 31, 33 have the same characteristic data. A low resistance load 34 can be operated at the comparator output 14.

By pushing the momentary-contact pushbutton 1 of the passive element, the resonance circuit 3 is closed so that energy is drawn from the sender 7. This leads to the triggering of a control signal so that the release or unlatching of the rear window 37 is achieved. The transmission between the passive element and the sender 7 is realized by employing the resonance frequency in a cable-less or wireless way. The passive secondary circuit 6, which is tuned to the sending frequency or, via the momentary-contact pushbutton 1, is detuned relative to the sending frequency, draws from the oscillator 9 in the resonance situation sufficient energy so that the drop of the high frequency voltage across the high frequency rectifier 12 to the downstream comparator circuit is detected. It supplies at the output 14 a corresponding logic signal for controlling an FET (field effect transistor) power breaker 40 with which the release action of the rear window 37 can be achieved.

As a result of the wireless release of the rear window 37 without use of electrical lines, cables and the like, a very simple mounting of the actuator results. The actuator is not susceptible to disturbances or failure and is, in particular, wear-free. The sender 7 requires only a minimal current which is, for example, only approximately 3 mA. Accordingly, the sender 7 can be in stand-by mode even over a long period of time without this drawing too much energy from the vehicle battery to which the sender is connected.

Advantageously, the sender 7 is coupled with the central locking system of the motor vehicle. When the vehicle is centrally locked, the sender 7 is also switched off so that it does not require any current. When the central lock is released, the sender 7 is also switched on so that it is operational. When the sender 7 is switched off by the central lock, there is no possibility for unauthorized persons to manipulate the sender 7 from the exterior and to open the rear window 37 without authorization.

Figure 5:
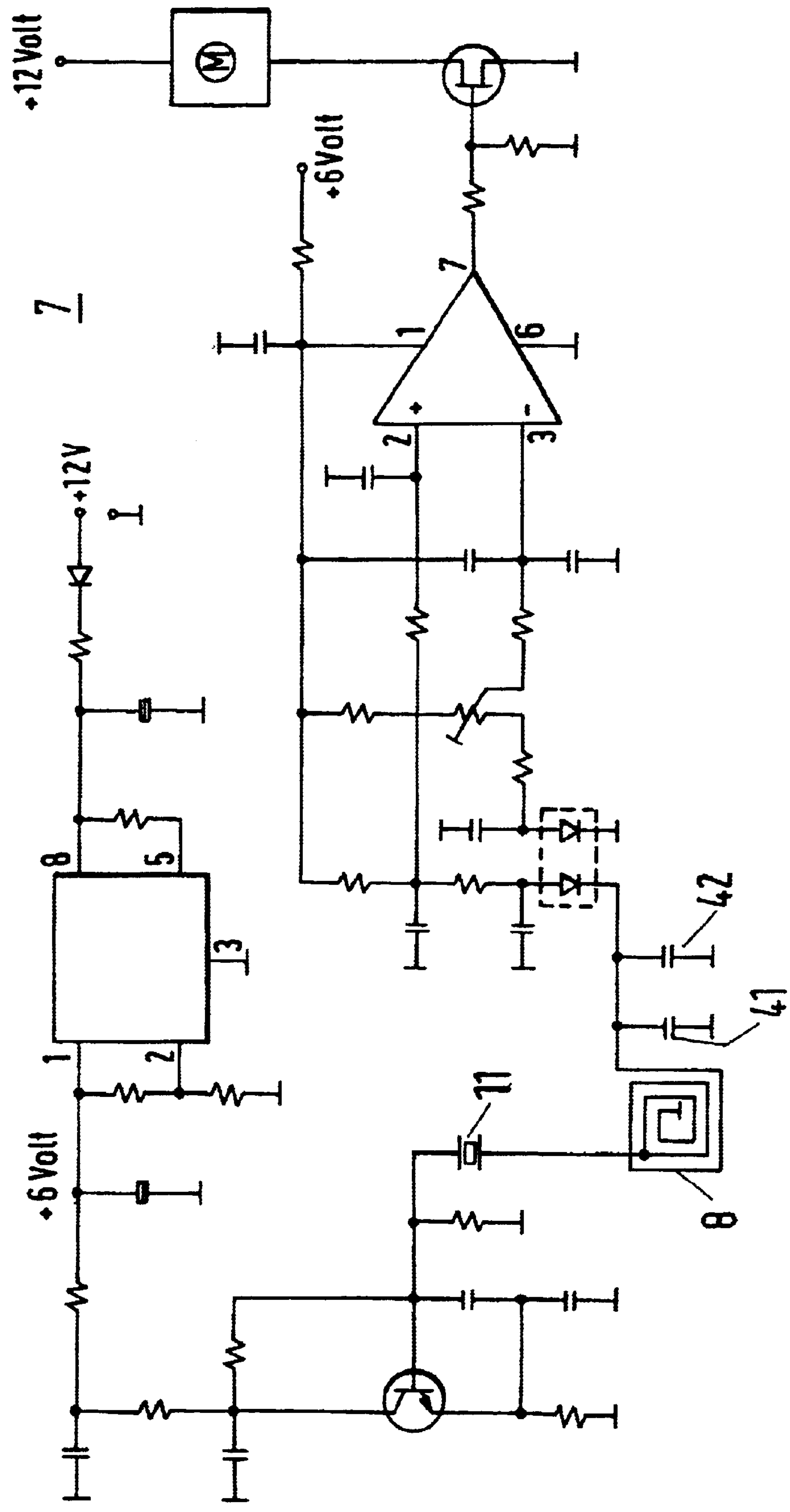
FIG. 5 shows a circuit diagram of a sender of a second embodiment of the actuator according to the invention.

FIG. 5 shows a sender 7 in which the quartz 11 is in resonance with a part of the antenna 8 and capacitors 41, 42 connected thereto. This keeps the load on the quartz 11 minimal. By tapping the antenna 8 (coil), a higher effective amplitude results at the upper coil tap. In this way, the sensitivity can be increased while simultaneously the quartz load is reduced.

In other respects, the sensor is substantially of the same configuration as in the preceding embodiment. It operates in the same way as the preceding embodiment.

While specific embodiments of the invention have been shown and described in detail to illustrate the inventive principles, it will be understood that the invention may be embodied otherwise without departing from such principles.

What is claimed is:

1. An actuator for a release device of a motor vehicle, comprising:

a control eating on the release device;

at least one actuator element configured to send a signal wireless to the control for triggering a release action of the release device;

wherein the control comprises an oscillator and at least one antenna, wherein the at least one antenna is part of the oscillator;

wherein the control comprises a rectifier arranged downstream of the oscillator, wherein the output signal of the rectifier is supplied to a comparator, wherein the comparator generates a control signal at an output of the comparator and the control signal releases the release device.

2. The actuator according to claim 1, wherein the actuator element is a momentary-contact pushbutton.

3. The actuator according to claim 1, comprising a passive receiver, wherein the actuator element is a part of the passive receiver.

4. The actuator according to claim 3, wherein the passive receiver comprises a passive antenna.

5. The actuator according to claim 4, wherein the passive antenna is a planar antenna.

6. The actuator according to claim 4, wherein the passive antenna is arranged in a resonance circuit.

7. The actuator according to claim 6, wherein the resonance circuit is closed by actuating the actuator element.

8. The actuator according to claim 6, further comprising a compensating element for tuning the passive antenna to the resonance frequency.

9. The actuator according to claim 8, wherein the compensating element comprises two parallel capacitors.

10. The actuator according to claim 1, wherein the antenna is a planar antenna.

11. The actuator according to claim 1, wherein the antenna is configured to have energy drawn when the actuator element is actuated.

12. The actuator according to claim 1, wherein the oscillator comprises a switching element.

13. The actuator according to claim 12, wherein the switching element is a transistor.

14. The actuator according to claim 12, further comprising a quartz, wherein the switching element is configured to be brought into resonance with the antenna by the quartz.

15. The actuator according to claim 1, wherein the rectifier comprises a temperature compensating member.

16. The actuator according to claim 1, wherein the release device acts on a rear window of the motor vehicle, wherein the rear window is mounted to be pivotable relative to a carbody part of the motor vehicle and is released when the control signal releases the release device.

17. The actuator according to claim 16, wherein the at least one actuator part is mounted on the rear window and wherein the control is mounted on the car body part, the actuator further comprising a passive receiver mounted on the rear window, wherein the at least one actuator element is a momentary-contact pushbutton that forms a part of the passive receiver.

18. An actuator for a release device of a motor vehicle, comprising:

a control acting on the release device;

at least one actuator element configured to send a signal wireless to the control for triggering a release action of the release device;

wherein the control comprises at least one antenna;

an oscillator, wherein the antenna is part of the oscillator;

a rectifier arranged downstream of the oscillator, wherein the output signal of the rectifier is supplied to a comparator;

wherein the output voltage of the oscillator is reduced and supplied to the comparator.

19. An actuator for a release device of a motor vehicle, comprising:

a control acting on the release device;

at least one actuator element configured to send a signal wireless to the control for triggering a release action of the release device;

wherein the control comprises at least one antenna;

an oscillator, wherein the antenna is part of the oscillator;

a rectifier arranged downstream of the oscillator, wherein the output signal of the rectifier is supplied to a comparator;

wherein the comparator compares the output signal of the rectifier with a regulator signal.

20. An actuator for a release device of a motor vehicle, comprising:

a control acting on the release device;

at least one actuator element configured to send a signal wireless to the control for triggering a release action of the release device;

wherein the control comprises at least one antenna;

an oscillator, wherein the antenna is part of the oscillator; and wherein the oscillator has a coupling point formed by a capacitor.

21. The actuator according to claim 20, wherein the output signal of the rectifier is supplied to a comparator.

22. The actuator according to claim 20, further comprising a rectifier arranged downstream of the oscillator, wherein the capacitor maintains the voltage above a threshold voltage of the rectifier.

* * * * *